United States Patent [19]
Wyeth et al.

[11] 3,718,229
[45] Feb. 27, 1973

[54] NONEVERTING BOTTOM FOR THERMOPLASTIC BOTTLES

[75] Inventors: Nathanial Convers Wyeth, Mendenhall, Pa.; Ronald Newman Roseveare; Keith Stewart Carmichael, both of Wilmington, Del.

[73] Assignee: E. I. du Pont de Nemours and Company, Wilmington, Del.

[22] Filed: Oct. 26, 1971

[21] Appl. No.: 192,059

[52] U.S. Cl. .......................................215/1 C, 150/.5
[51] Int. Cl. .................................................B65d 1/02
[58] Field of Search..........................215/1 C; 150/.5

[56] References Cited
UNITED STATES PATENTS 3,511,401  7/1968  Lachner................................215/1 C Primary Examiner—Donald F. Norton
Attorney—Louis Del Vecchio

[57] ABSTRACT

A generally cylindrical, biaxially oriented thermoplastic bottle for bottling liquids under pressure, such as beer, soda and aerosols, having a noneverting bottom under conditions of bottling and use. The bottom of the bottle in the unpressurized state comprises a shell of thermoplastic material having a configuration defined as a series of sequentially connected geometric shapes rotationally symmetrical about the central axis of the bottle starting with (a) about a 90° portion of a circle connected to the generally cylindrical section of the bottle, forming the annular bottom edge, connected to (b) a straight line forming a flat section which is the bottom seating area of the bottle, connected to (c) about a 90° portion of a circle forming an annular toroidal knuckle turning into (d) a straight line forming a re-entrant cylinder connected to (e) about a 180° portion of a circle forming a recessed annular toroidal knuckle ending with (f) a straight line forming a recessed disc in the bottom center of the bottle. To further improve eversion resistance, the bottom of the bottle can include a reinforcing ring attached to the recessed annular toroidal knuckle. Under an autogenous pressure, the bottle dimensions remain practically the same except that the flat bottom seating area moves outward and the bottle now stands on the annular toroidal knuckle that turns upward into the re-entrant cylinder.

6 Claims, 5 Drawing Figures

PATENTED FEB 27 1973

3,718,229

INVENTORS
NATHANIAL CONVERS WYETH
RONALD NEWMAN ROSEVEARE
KEITH STEWART CARMICHAEL
BY
ATTORNEY

NONEVERTING BOTTOM FOR THERMOPLASTIC BOTTLES

BACKGROUND OF THE INVENTION

This invention relates to the art of manufacturing thermoplastic bottles useful in bottling liquids under pressure such as sodas, beer and aerosols and is particularly concerned with providing a bottle having a bottom that will not evert during use.

It is known that thermoplastic bottles can be used to bottle beverages for consumer use. If the bottle is used to contain carbonated beverages such as soda or beer, the bottle must be designed to constrain the autogenous pressure in the bottle while remaining dimensionally stable in shape and volume.

Thermoplastics, however, by nature will deform at moderate temperatures under relatively small loads and therefore, when formed into plastic bottles and use in bottling liquids under pressure, they will deform in normal use. For example, at a temperature of about 50° C. and under an autogenous pressure of about 100 psi, i.e., about the highest pressure typically found in a soda or beer bottle, plastic bottles have a tendency to deform into the shape of a sphere. One way of significantly reducing this tendency is to make the shell of the bottle very thick. While functional, this is not economical and, furthermore, tends to make the bottle so rigid that it fractures in normal use. It has been found, however, that by making a thin-shelled bottle and molecularly orienting the polymer, the yield stress in the side walls can be improved sufficiently to resist this tendency to deform. However, it is very difficult to molecularly orient the polymer in the bottom of the bottle. Therefore, the bottom retains this tendency to deform, i.e., evert.

In general, the bottom of a bottle is conventionally rather flat, permitting the bottle to stand upright. In unpressurized applications, this is not a severe requirement and flat-bottomed bottles can be used successfully. In pressurized applications, however, a flat bottom is inherently a poor shape to hold rigid and the bottom tends to evert into the shape of a hemisphere, increasing the volume of the bottle, distorting the bottom shape and eliminating the possibility of the bottle being able to stand on a flat surface. Therefore, the low stress capabilities of the plastic coupled with high temperatures for extended time periods under sufficient internal pressure, will cause the plastic to creep or deform so that shape and volume change excessively even though the contents, i.e., gas and the liquid, are successfully contained within the bottle.

Therefore, it is desirable to find a way of making a plastic bottle useful in bottling liquids under pressure having a bottom that will not evert and will, at the same time, maintain a base sufficient for the bottle to stand on when used to bottle liquids under pressure.

SUMMARY OF THE INVENTION

Accordingly, the present invention provides a thermoplastic bottle having a noneverting bottom when subjected to temperatures up to about 50° C. and autogenous pressures up to about 100 psig. The bottle is a generally cylindrical, biaxially oriented, thermoplastic bottle having a shell thickness dependent primarily on the size of the bottle and the intended use. The bottle is preferably prepared from a polymer having a modulus of elasticity at yield of at least 180,000 psi.; a tensile strength of at least 5,000 psi; a Poisson's Ratio of 0.35 to 0.4; and a deformation constant equal to the slope of the log (reciprocal of the strain rate) versus strain having a value of at least about 0.65.

The structural design of the bottom in the unpressurized state consists essentially of a shell of thermoplastic material having a configuration defined as a series of sequentially connected geometric shapes rotationally symmetrical about the central axis of the bottle consisting essentially of:

a. about a 90° portion of a circle having a radius of about 0.15 to 0.25D, with the center of curvature along a line perpendicular to the central axis of the bottle at the point where the generally right cylindrical section meets the bottom section, said circle being connected at one end to the generally cylindrical section of the bottle extending toward the bottom of the bottle curving in toward the central axis forming a curved annular section which is the edge of the bottom of the bottle connected to b. a straight line directed toward the central axis of the bottle having a length of about 0.05 to 0.15D forming a flat annular ring connected to c. about a 90° portion of a circle having a radius of about 0.02–0.04D with the center of curvature along a line perpendicular to the end of the straight line of (b) above to which this portion of a circle is connected said circle forming an annular toroidal knuckle turning upward and into the interior of the bottle, connected to d. a straight line wall section directed into the interior of the bottle about parallel to the central axis of the the bottle having a length of about 0.1 to 0.2D forming a re-entrant cylinder in the bottom of the bottle connected to e. about a 180° portion of a circle having a radius of about 0.02–0.04D, with the center of curvature along a line perpendicular to the end of the straight line (d) above to which this portion of a circle is connected said circle forming a recessed annular toroidal knuckle connected to f. a horizontal straight line which extends to the central axis of the bottle forming a recessed disc in the bottom center of the bottle and the distance between the central axis of the bottle and the center of the 90° portion of a circle forming an annular toroidal knuckle turning upward and into the interior of the bottle is 0.2–0.35D where D is the outside diameter of the bottle measured perpendicular to the central axis of the bottle in the plane where the bottom section meets the generally right cylindrical section of the bottle.

In an alternate embodiment, a reinforcing ring is formed on the recessed annular toroidal knuckle. The reinforcing ring is formed by two concentric contacting side-wall sections joined by a toroidal knuckle.

When the bottle contains an autogenous pressure such as that encountered in normal use, i.e., bottling soda or beer, the bottle dimensions remain practically the same except that the bottle elongates a nominal amount in the axial direction, and the flat bottom seating area moves outward forming a smooth transitional curve between the 90° portion of a circle forming the annular bottom edge of the bottle and the toroidal knuckle that turns upward into the re-entrant cylinder and this toroidal knuckle then becomes the seat on which the bottle now stands.

DETAILS OF THE INVENTION

Figure 1:
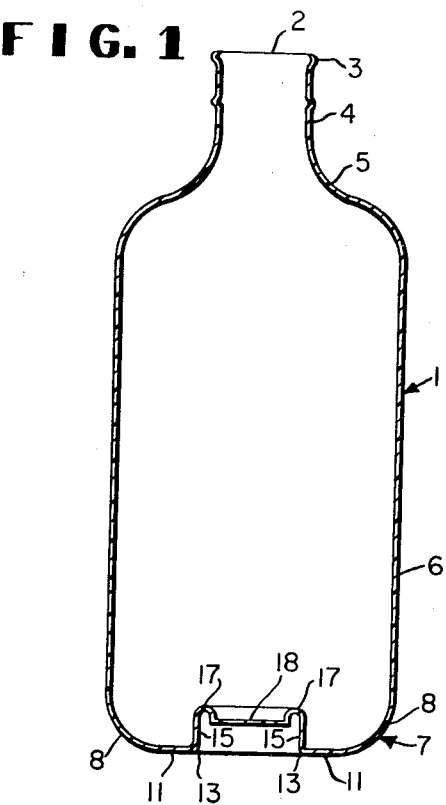
FIG. 1 is a cross-sectional view of a plastic bottle made according to the present invention.

FIG. 1 shows a front view of a thermoplastic bottle incorporating the noneverting bottom design of the present invention. The bottle 1 is a hollow container having an opening 2 at one end used to pour liquid into or out of the bottle. The bottle is made up of a lip portion 3 surrounding opening 2, a narrow, generally cylindrical neck section 4, a cone frustum section 5, a large, generally cylindrical section 6 and a non-everting bottom section 7 which will be described below in detail.

The term "evert" is used in its common sense, i.e., to turn outward; and a bottle having a noneverting bottom is used to mean a bottle in which the bottom will not turn outward under normal use conditions to a point where it is unsightly or would not stand. Normal use conditions are generally no greater than a temperature of about 0°–50° C. and an autogenous, i.e., internal positive pressure typically about 60 psig. in sodas; however, it can extend up to about 100 psig. It is to be understood that under an autogenous pressure some movement, usually nominal elongation, will occur that is not eversion.

Eversion can be caused by a number of factors. Perhaps the two most important factors are (a) overstressing of the plastic material, used to make the bottle, particularly where the internal pressure of the bottle causes stresses in the bottle that exceed the yield stress of the material resulting in large material deflections and deformations; and (b) geometric instability. The noneverting bottle of the present invention possesses adequate resistance to eversion due to these factors.

The bottom geometry of the bottle will now be described in relation to FIGS. 1 to 4 of the drawings.

In describing the bottom geometry and as herein used, D equals the outside diameter of the bottle measured in the plane defined by the cross section where the bottom section meets the generally cylindrical section of the bottle that is perpendicular to the central axis. The central axis, sometimes referred to as the center line, of the bottle, is an imaginary line running from top center to the bottom center of the bottle. All dimensions are outside dimensions, i.e., mold dimensions.

The upper configuration of the bottle is not critical to the bottom design of this invention. For example, the neck portion can be short with a definite shoulder in the bottle or elongated with a smooth transition into the generally cylindrical portion of the bottle. The main portion of the bottle, namely, the generally right cylindrical section, can be of varying diameter fluted or otherwise decoratively shaped to obtain a desirable aesthetic appearance. When the bottle is made and used in unpressurized applications, it has the general configuration shown in FIGS. 1 and 2. When pressurized, the annular flat bottom portion moves outwardly, taking on a new configuration as shown in FIGS. 3 and 4.

Figure 2:
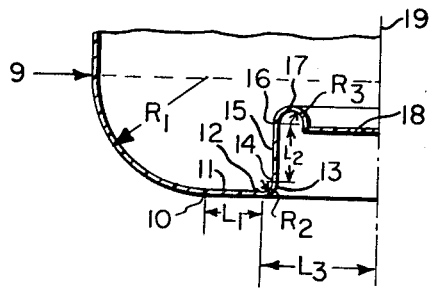
FIG. 2 is an enlarged cross section of a portion of the bottom of the bottle shown in FIG. 1.

Referring to FIGS. 1 and 2, the bottom is comprised of a thin shell of thermoplastic material having a configuration defined as a series of geometric connected shapes rotationally symmetrical about the central axis of the bottle. The geometric shapes will be described in relation to one-half of a cross section of the bottom section of the bottle as shown in FIG. 2. The bottom section 7 joins the right cylinder section 6 with a. about a 90° portion of a circle 8 having a radius $R_1$ of about 0.15 to 0.25D, with the center of curvature along a line perpendicular to the central axis of the bottle at the point where the generally right cylinder section meets the bottom section, said circle being connected at one end 9 to the right cylinder section 6 of the bottle extending toward the bottom of the bottle curving in toward the central axis terminating at 10 in alignment with the bottom seating area of the bottle forming a curved annular section which is the edge of the bottom of the bottle that is connected to b. a straight line 11 directed toward the central axis of the bottle having a length $L_1$ of about 0.05 to 0.15D forming a flat annular ring which is the seating area of the bottle that is connected to c. one end 12 of about a 90° portion of a circle having a radius $R_2$ of about 0.02–0.04D with the center of curvature along a line perpendicular to the straight line of (b) above, to which this end of a circle is connected, said circle forming an annular toroidal knuckle 13 turning upward into the interior of the bottle that is connected to d. one end 14 of a straight line wall section 15 directed into the interior of the bottle about parallel to the central axis of the bottle having a length $L_2$ of about 0.1–0.2D forming a re-entrant cylinder in the bottom of the bottle which is connected to e. one end 16 of about a 180° portion of a circle having a radius of about 0.02–0.04D with the center of curvature along a line perpendicular to the end of the straight line (d) above to which this portion of a circle is connected, said circle forming a recessed annular toroidal knuckle 17 that is connected to f. a horizontal straight line section 18 which extends to the central axis 19 of the bottle forming a recessed disc in the bottom center of the bottle and the distance $L_3$ between the central axis 19 of the bottle and the center of the 90° portion of a circle forming the toroidal knuckle 13 is 0.2–0.35D.

Figure 3:
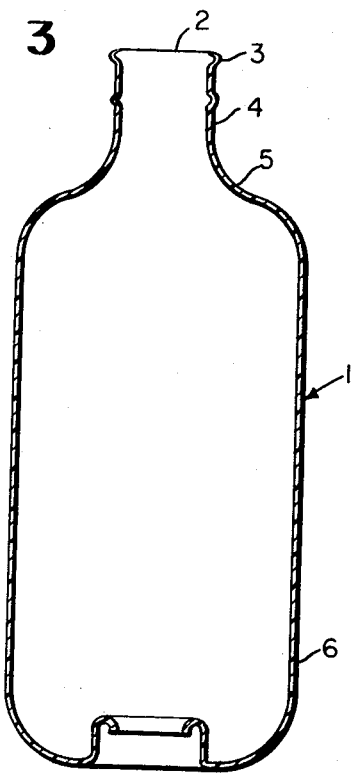
FIG. 3 is a cross-sectional view of the same bottle shown in FIG. 1 when it contains an autogenous pressure that forces the bottom to assume a new configuration.
Figure 4:
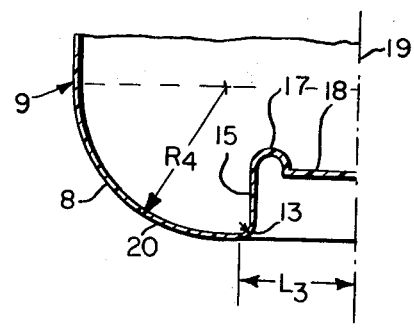
FIG. 4 is an enlarged cross section of a portion of the bottom of the bottle shown in FIG. 3.

When the bottle contains an autogenous pressure such as that encountered in bottling sodas or beer, the bottom of the bottle deforms and takes on the configuration shown in FIGS. 3 and 4. The bottle dimensions remain practically the same except that the flat bottom seating area 11 moves outward forming a transitional curve 20 between the annular bottom edge 8 and the toroidal knuckle 13 which turns upward into the re-entrant cylinder 15 and the toroidal knuckle 13 then becomes the seat on which the bottle now stands. The complete curve from the generally right cylindrical section of the bottle to the toroidal knuckle which turns upward into the interior of the bottle includes about 50° to 80° of a circle having a radius $R_4$ of about 0.25 to 0.50D with the center of curvature along a line perpendicular to the central axis of the bottle at the bottle at the point where the generally right cylindrical section meets the bottom section.

Because of the wide, flat base ($L_1+L_3$), this bottle in the unpressurized state has excellent standing stability which is important when the bottle is being handled empty. Under pressure, however, the standing base diminishes to the dimensions of $L_3$ which is never less than the amount needed to provide sufficient standing stability.

The toroidal knuckles 13 and 17 aid in resisting bending and the smaller the radius of each toroid, the more rigid the bottom. The re-entrant cylinder 15 acts as a holding band, preventing the bottom from widening.

Figure 5:
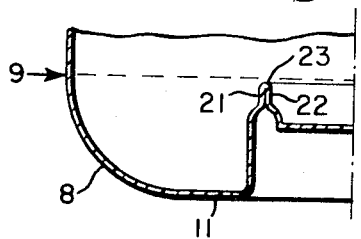
FIG. 5 is an enlarged cross section of a portion of the bottom of the bottle shown in FIG. 1, incorporating the alternate embodiment of a reinforcing ring.

In an alternate embodiment, shown in FIG. 5, a reinforcing ring dependent from the internal surface of the recessed toroidal knuckle 17 is formed by two concentric contacting side walls 21 and 22 each having a length of about 0.05 to 0.20D joined by a toroidal knuckle 23. This reinforcing ring improves the eversion resistance of the bottom of the bottle.

The thermoplastic bottles prepared according to the present invention are particularly useful for bottling liquids under pressure, such as beer, soda or aerosols. These bottles can be made transparent or tinted for aesthetic reasons and exhibit excellent physical properties such as eversion resistance, impact resistance and durability.

Thermoplastics useful in preparing bottles having a bottom designed according to the present invention are polyethylene terephthalate, acrylonitrile/styrene/methyl acrylate copolymer, acrylonitrile/ethylene/methyl acrylate copolymer, methacrylonitrile copolymers, polycarbonates, polysulfones, polybis(p-aminocyclohexyl)-dodecaneamide or polyformaldehyde resin. Polyethylene terephthalate is preferred because of its excellent strength properties, particularly a high tensile strength, excellent impact strength and relatively low creep.

Polyethylene terephthalate useful in preparing the thermoplastic articles of this invention includes (a) polymers wherein at least about 97 percent of the polymer contains the repeating ethylene terephthalate units of the formula:

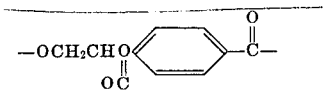

with the remainder being minor amounts of ester-forming components, and (b) copolymers of ethylene terephthalate wherein up to about 10 mole percent of the copolymer is derived from other ester-forming components which are substituted for corresponding amounts of the usual glycol and/or the carboxylic reactants. Other ester-forming components include the monomer units of diethylene glycol; propane-1,3-diol; butane-1,4-diol; polytetramethylene glycol; polyethylene glycol; polypropylene glycol; 1,4-hydroxymethylcyclohexane and the like or isophthalic, bibenzoic, naphthalene 1,4- or 2,6-carboxylic, acipic, sebacic, decane-1,10-dicarboxylic acid, and the like.

The specific limits on the comonomer are governed by the glass transition temperature of the polymer. It has been found that when the glass transition temperature extends below about 50° C., a copolymer having reduced mechanical properties results. Accordingly, this corresponds to the addition of no more than about 10 mole percent of a comonomer. One exception to this, for example, is the addition of bibenzoic acid where the glass transition temperature of the copolymer remains above 50° C. and does not drop with the addition of more than 10 mole percent. Others would be obvious to those skilled in the art.

In addition, the polyethylene terephthalate polymer can include various additives that do not adversely affect the polymer in use such as stabilizers, e.g., antioxidants or ultraviolet light screening agents, extrusion aids, additives designed to make the polymer more degradable or combustible, such as oxidation catalysts, as well as dyes or pigments.

The polyethylene terephthalate should have an inherent viscosity (10 percent concentration of polymer in a 37.5/62.5 weight percent solution of tetrachloroethane/phenol, respectively, at 30° C.) of at least 0.55 to obtain the desired end properties in the articles formed and preferably the inherent viscosity is at least about 0.7 to obtain an article having excellent toughness properties, i.e., resistance to impact loading. The viscosity of the polymer solution is measured relative to that of the solvent alone and the $$\text{Inherent viscosity} = \frac{\text{natural logarithm} \frac{\text{viscosity of solution}}{\text{viscosity of solvent}}}{C}$$

where C is the concentration expressed in grams of polymer per 100 milliliters of solution.

In the preferred embodiment wherein the thermoplastic is polyethylene terephthalate, the plastic bottle preferably has at least the following characteristics, particularly in the bottom portion of the bottle:

a. a modulus of elasticity at yield of 180,000 psi;
b. a tensile strength at break of at least 5,000 psi;
c. a Poisson's Ratio of 0.35 to 0.4; and
d. a deformation constant equal to the slope of the log (reciprocal of the strain rate) versus strain having a value of at least about 0.65.

The modulus of elasticity at yield is the ratio of stress to strain of a specimen in tension wherein the tensile yield stress is that stress at which the specimen begins to stretch without an increase in load. The modulus of elasticity at yield is determined by ASTM D-882, Tensile Properties of This Plastic Sheeting.

The tensile strength at break is also determined by ASTM D-882 wherein a specimen is placed under increasing tension until it breaks.

The deformation constant is a measure of creep. Creep is usually measured on polymers by placing a sample under a fixed load, i.e., stress, at a constant temperature and measuring the strain deformation as a function of time. The curves for thermoplastics have a characteristic shape in which the rate of strain decreases as a function of time. A plot of the log (reciprocal of the strain rate) versus strain results in a linear plot over a substantial part of the creep curve. The slope of the straight line segment herein referred to as the deformation constant, is mathematically expressed as:

$$DC = d \log (dt/d\epsilon)/d\epsilon$$

where $DC$ = deformation constant,
$dt$ = differential of time, and
$d\epsilon$ = differential of the strain.

This deformation constant is applicable to related thermoplastics and can be used to compare the creep behavior by comparing the slope values. A deformation constant equal to 0 indicates that the sample being tested is extending at its natural strain rate or for the load indicated, the strain rate is constant. A deformation constant of infinity indicates that there is no measurable strain indicated.

For bottles prepared from polyethylene terephthalate according to the preferred embodiment of the present invention, the deformation constant is at least about 0.65, indicating a deformation of less than 5 percent in 100 hours at 50° C. with an autogenous pressure of 75 psig.

The preferred plastic bottle has a shell thickness that is primarily dependent on (a) the size of the bottle being made with particular consideration given to the liquid capacity and the diameter of the bottle along with (b) the use intended for the bottle particularly considering the autogenous pressure developed during use.

Bottles intended for use in containing pressures up to about 100 psig. at a temperature of about 50° C. have typical shell thicknesses in accordance with the following design sizes. Bottles having a fluid capacity of about 6 to 16 fluid ounces and a diameter in the generally right cylindrical section of about 2 to 2.5 inches have a shell thickness in the right cylindrical section of at least about 15 mils, and a thickness of at least about 45 mils and preferably 50 mils in the bottom section. Bottles having a fluid capacity of greater than 16 ounces and up to about 32 ounces and a diameter of about 3 to 4 inches have a shell thickness in the right cylindrical section of at least about 30 mils and a thickness of at least about 60 mils in the bottom section.

In the event that the bottles will be used in applications where the autogenous pressure will be something different than 100 psig. at 50° C., the thickness of the shell can then be adjusted to meet the specific pressure demands. In general, increased pressures will require an increased shell thickness, and a decreased shell thickness can be used with decreased pressures. The specific suitable thickness can be determined experimentally or mathematically using known pressure vessel technology.

A preferred process for preparing bottles having the bottom geometry designed according to the present invention is disclosed in U.S. Pat. application Ser. No. 93,571, filed Nov. 30, 1970, hereby incorporated by reference. The process produces a hollow, biaxially oriented, thermoplastic article by extruding a hollow, cylindrical, thermoplastic slug with a ramrod through an annular orifice into a slidable mold at a temperature within its molecular orientation range to a shape relatively larger than the original shape of the slug. The annular orifice is formed by a sprue, i.e., the cylinder through which the slug is ramrodded, and an opposing mandrel. The mold has an annular bead recess at one end to accept and hold one end of the extrudate while simultaneously drawing the extrudate in the direction of extrusion and expanding the extrudate by forcing a gas or liquid against the interior portions of the extrudate, expanding the extrudate to conform to the mold while sliding the mold past the extrusion orifice as continuous extrusion takes place.

The reinforcing ring, as shown in FIG. 5, including side walls 21 and 22 and toroidal knuckle 23 are conveniently formed by continuing to extrude polymer after the sliding mold has come to a stop forcing polymer up and around the mandrel that forms part of the extrusion orifice. The extra polymer needed to form the reinforcing ring can be supplied by using a slightly longer slug.

It will be appreciated that other processes can be used to reproduce a bottle having a bottom geometry in accordance with the design of the present invention.

The bottom design of the present invention can be used on various types or sizes of plastic bottles and can be used in pressurized or unpressurized applications. However, it finds particular use in bottling liquids under pressure such as soda or beer in typically sized bottles, such as 6 oz., 8 oz., 10 oz., 12 oz., and 16 oz. bottles.

The following examples illustrate this invention.

EXAMPLE 1

Twenty-five plastic bottles are prepared according to the process of U.S. Pat. application Ser. No. 93,571, filed Nov. 30, 1970, wherein a hollow thermoplastic slug is extruded through an annular orifice into a slidable mold wherein the mold has a bead recess at one end to accept the extrudate. Then the mold is made to slide by the extrusion orifice as continuous extrusion takes place, drawing the extrudate as the mold slides while the extrudate is simultaneously forced against the interior walls of the mold by introducing a fluid, i.e., nitrogen, under pressure into the interior of the extrudate.

The slug is amorphous and is prepared from polyethylene terephthalate having an inherent viscosity of about .85.

Each bottle holds a capacity of about 10 ounces and has an outside diameter at the right cylinder section of about 2.25 inches with a corresponding shell thickness of about 30 mils. In the bottom section of the bottle, the average thickness of the shell is about 50 mils.

The bottles are prepared from the same mold and have the same bottom shape as shown in the drawings (see FIG. 3) wherein the actual dimensions are:

$R_1 = 0.440$-inch $R_2 = 0.090$-inch $R_3 = 0.100$-inch $R_4 = 0.75$-inch $L_1 = 0.185$-inch $L_2 = 0.200$-inch $L_3 = 0.500$-inch The bottles are first tested by hydrostatic pressurization to 300 psig. at room temperature. The bottom moves outward taking on the configuration shown in FIG. 3 but does not evert and the bottle remains self-standing.

The bottles are then tested by placing in each bottle about 10 ounces of 0.15 molar sulfuric acid and seven 10-grain tablets of $NaHCO_3$ (4.5 gram total), capping immediately and allowing an autogenous pressure of 60 psig. to build up at room temperature due to the $CO_2$ generated by the acid and bicarbonate. In all cases, the original flat bottom moves outwardly a maximum of about 0.08 inch but the bottom does not evert and will stand on a flat surface.

Thereafter, the bottles are stored for 28 days at 100° F. with internal pressures varying between about 75 and 100 psig. In all cases, the bottles do not evert.

These same bottles are dropped on their bottoms 20 times on to concrete from a height of 5 feet. No bottle is found to crack, break, split or evert. In test drops from 20 feet, the cap is forced off of 5 bottles, but no bottle is found to crack, break, split or evert.

EXAMPLE II

A bottle is prepared in the same manner as that described in Example I, except that the bottom of the bottle includes a reinforcing ring of polymer, as shown in FIG. 5. This ring of polymer is formed by continuing to extrude polymers after the sliding mold has come to a stop, forcing polymer up and around the mandrel that is part of the die extrusion orifice and thereafter closing the bottom of the bottle. This reinforcing ring is formed of two contacting walls having a length of about 0.12 inch and a combined thickness of about 0.15-inch.

This bottle is hydrostatically pressurized to about 320 psig. at room temperature before the bottle splits in the neck region of the bottle. The bottom does not evert or otherwise deform.

We claim:

1. In a generally cylindrical thermoplastic bottle biaxially oriented in at least the generally right cylindrical section the improvement wherein the bottom configuration is defined as a series of geometric shapes rotationally symmetrical about the central axis of the bottle consisting essentially of
    a. about a 90° portion of a circle having a radius of about 0.15 to 0.25D, with the center of curvature along a line perpendicular to the central axis of the bottle at the point where the generally right cylindrical section meets the bottom section, said circle being connected at one end to the generally cylindrical section of the bottle extending toward the bottom of the bottle curving in toward the central axis forming a curved annular section which is the edge of the bottom of the bottle connected to
    b. a straight line directed towards the central axis of the bottle having a length of about 0.05 to 0.15D forming a flat annular ring connected to
    c. about a 90° portion of a circle having a radius of about 0.02–0.04D, with the center of curvature along a line perpendicular to the end of the straight line of (b) above to which this portion of a circle is connected, said circle forming an annular toroidal knuckle turning upward and into the interior of the bottle, connected to
    d. a straight line wall section directed towards the interior of the bottle about parallel to the central axis of the bottle having a length of about 0.1 to 0.2D forming a re-entrant cylinder in the bottom of the bottle connected to
    e. about a 180° portion of a circle having a radius of about 0.02–0.04D, with the center of curvature along a line perpendicular to the end of the straight line (d) above to which this portion of a circle is connected, said circle forming a recessed annular toroidal knuckle connected to
    f. a horizontal straight line which extends to the central axis of the bottle forming a recessed disc in the bottom center of the bottle and the distance between the central axis of the bottle and the center of the 90° portion of a circle forming an annular toroidal knuckle turning upward and into the interior of the bottle is 0.2–0.35D where D is the outside diameter of the bottle measured perpendicular to the central axis of the bottle in the plane where the bottom section meets the generally right cylindrical section of the bottle.

2. The bottle of claim 1 in which the bottle contains an autogenous pressure up to about 100 psi. and the straight line forming the flat bottom seating area moves outward forming a smooth transitional curve between the annular bottom edge and the toroidal knuckle that turns upward into the re-entrant cylinder wherein this toroidal knuckle becomes the seat on which the bottle now stands and the resulting curve starting from the generally right cylindrical section of the bottle extending to the toroidal knuckle that turns upward into the re-entrant cylinder includes an arc of about 50° to 80° having a radius of about 0.25 to 0.5D, with the center of curvature along a line perpendicular to the central axis of the bottle at the point where the generally right cylindrical section meets the bottom section of the bottle.

3. The bottle of claim 1 including a reinforcing ring dependent from the top interior portion of the 180° portion of a circle (e) above forming the recessed annular toroidal knuckle wherein the reinforcing ring is two concentric contacting side walls having a length of about 0.05 to 0.20D joined by a toroidal knuckle.

4. The bottle of claim 1 prepared from polyethylene terephthalate having an inherent viscosity of at least 0.55; a modulus of elasticity at yield of at least 180,000 psi.; a tensile strength of at least 5,000 psi.; a Poisson's ratio of about 0.35–0.4; and a deformation constant equal to the slope of the log (reciprocal of the strain rate) versus strain having a value of at least about 0.65.

5. The bottle of claim 4 having a fluid capacity of about 6 to 16 ounces, a diameter in the generally right cylindrical section of about 2 to 2.5 inches, and a shell thickness in the generally right cylindrical section of at least about 15 mils with a thickness of at least about 45 mils in the bottom section.

6. The bottle of claim 4 having a fluid capacity greater than 16 ounces up to about 32 ounces, a diameter in the generally right cylindrical section of about 3 to 4 inches and a shell thickness in the generally right cylindrical section of at least about 30 mils with a thickness of at least about 60 mils in the bottom section.

* * * * *